United States Patent [19]

Bost

[11] Patent Number: 4,696,623

[45] Date of Patent: Sep. 29, 1987

[54] HELICOPTER ROTOR BLADE MADE FROM A MULTISPAR COMPOSITE MATERIAL WITH TORSION COMPARTMENTS AND A PROCESS FOR MANUFACTURING SAME

[75] Inventor: Michel Bost, Val-de-Marne, France

[73] Assignee: Aerospatiale Societe Nationale Industrielle, Paris, France

[21] Appl. No.: 807,148

[22] Filed: Dec. 10, 1985

[30] Foreign Application Priority Data

Dec. 19, 1984 [FR] France ................. 84 19432

[51] Int. Cl.$^4$ ........................................... B64C 27/46
[52] U.S. Cl. ..................................... 416/230; 416/226
[58] Field of Search ............... 416/226, 229 R, 229 A, 416/230 R, 230 A

[56] References Cited

U.S. PATENT DOCUMENTS

| | | | |
|---|---|---|---|
| 3,055,437 | 9/1962 | Stack | 416/229 R |
| 3,112,797 | 12/1963 | Haw | 416/229 R |
| 3,484,174 | 12/1969 | McCoubrey | 416/132 |
| 3,782,856 | 1/1974 | Salkind et al. | 416/226 |
| 3,950,115 | 4/1976 | Euler | 416/230 A |
| 4,251,309 | 2/1981 | Class et al. | 416/230 A |

FOREIGN PATENT DOCUMENTS

| | | | |
|---|---|---|---|
| 2305343 | 10/1976 | France. | |
| 2899 | 1/1978 | Japan | 416/229 R |
| 163896 | 7/1964 | U.S.S.R. | 416/229 |

OTHER PUBLICATIONS

European Patent No. 61,567, Apr. 1981.

Primary Examiner—Abraham Hershkovitz
Assistant Examiner—John Kwon
Attorney, Agent, or Firm—Armstrong, Nikaido, Marmelstein & Kubovcik

[57] ABSTRACT

The invention provides a helicopter rotor blade made from a composite material whose multistrut resistant framework adjacent the leading edge is disposed so as to form two superimposed compartments.

5 Claims, 8 Drawing Figures

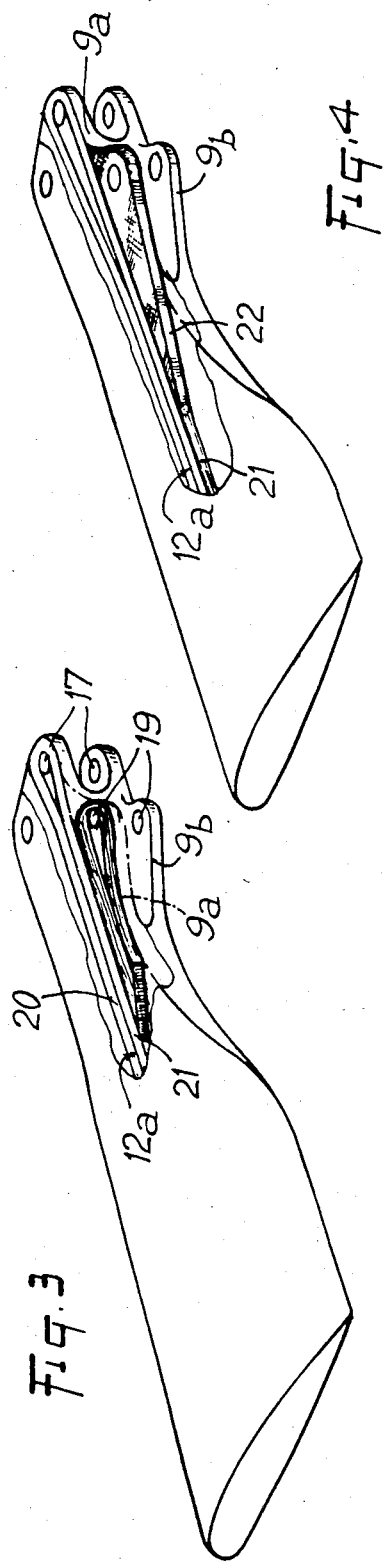
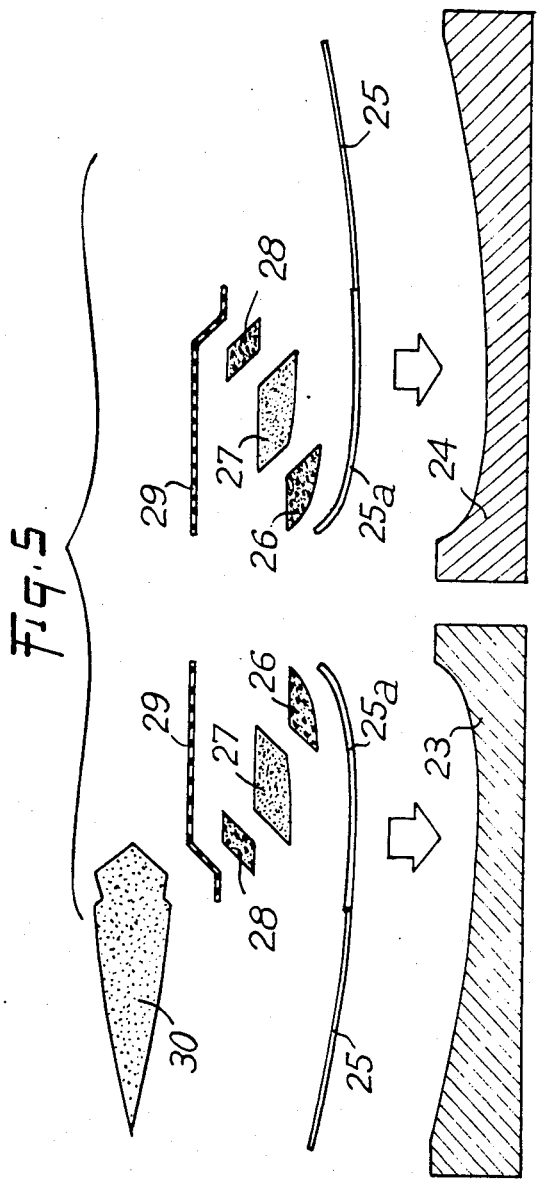

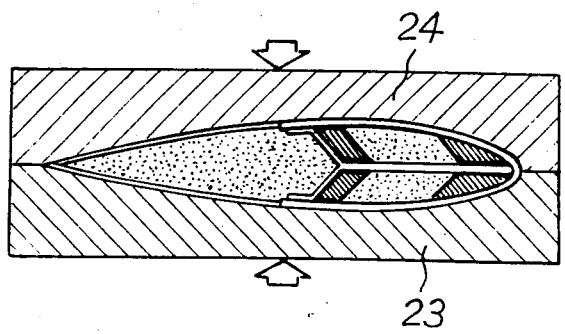
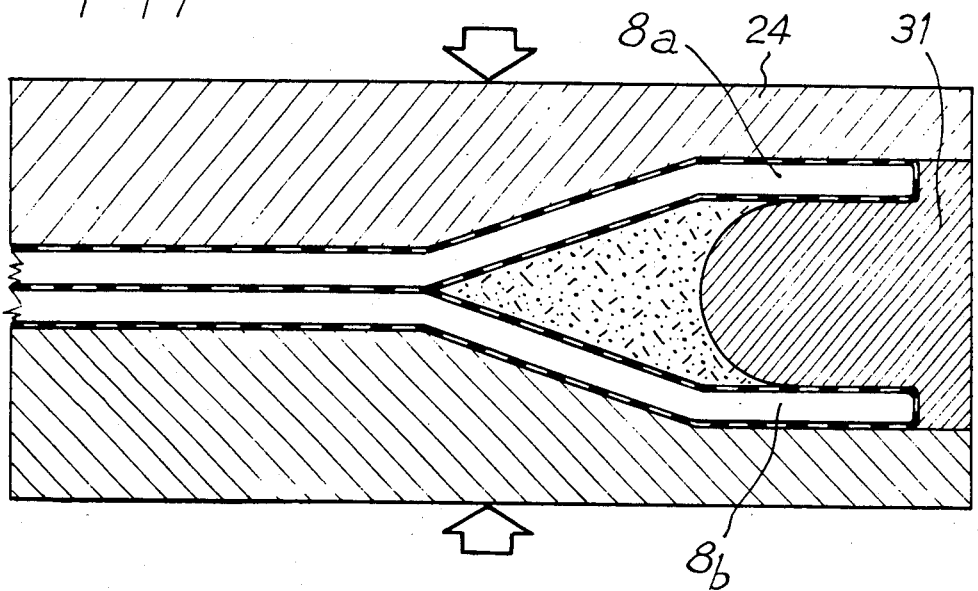
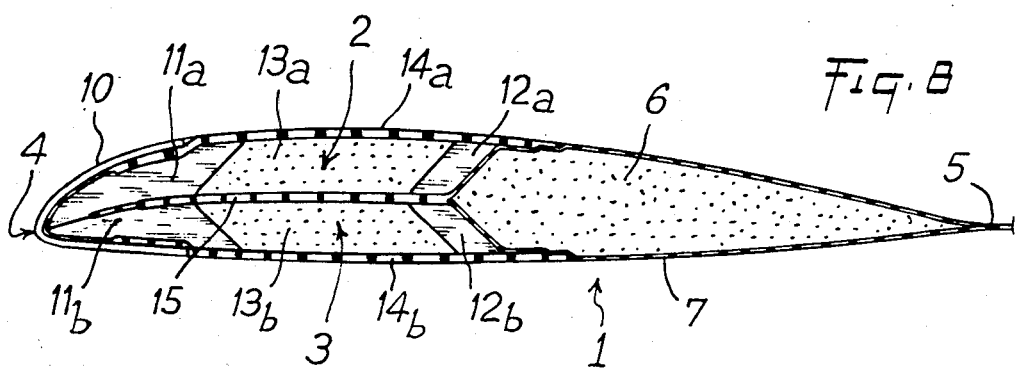

HELICOPTER ROTOR BLADE MADE FROM A MULTISPAR COMPOSITE MATERIAL WITH TORSION COMPARTMENTS AND A PROCESS FOR MANUFACTURING SAME

BACKGROUND OF THE INVENTION

1. Field of the Invention

The invention relates to a blade made from a composite material for a helicopter rotor whose structure is particularly well adapted not only to bending but also to twisting forces and which is further-more redundant; this quality allows the operating integrity to be maintained after structural damage. This type of structure is also well adapted to blades whose root is "forked".

2. Description of the Prior Art

It is in fact known that for forming the root of the blades and fastening them to the articulations of the hub which allow angular movements of said blades in so far as the angle of attack, flapping and drag are concerned, particularly when these articulations are formed by an angularly deformable resilient body, known under the name of "laminated spherical thrust block" and such as described in French Pat. No. 2 427 251 filed on the June 2, 1978 in the name of the assignee, it is advantageous for the blade foot to comprise two branches forming a fork whose end is bolted directed to the internal frame of the laminated spherical thrust block. This type of construction provides on the one hand a simplification of the construction of the rotor and lightening thereof by reducing the number of constituent parts and, on the other hand, allows the blade/hub connection to be placed closer to the center of oscillation of the blade, which results in an appreciable reduction of the dynamic forces applied to the fastening. This gives to this member a better fatigue strength and an unlimited lifespan.

Furthermore, compartment blades are known comprising either a single compartment in the vicinity of the leading edge or multiple compartments in the direction of the chord of the blade. The main advantage of such blades resides in their very high torsional rigidity for eliminating the vibrations due to coupling between the bending and twisting deformations of the blade. However, and more especially in the case of a blade having a fastening fork, construction thereof becomes complex while not giving entire satisfaction in so far as the strength of the connection zone of the current part of the structure to the forked root is concerned.

In fact, a structure having a single compartment which must be divided into two compartments to form the two branches of the bork presents a discontinuity in the transition zone which is very unfavorable for the passage of torsional forces in particular. For structures with multiple compartments in the direction of the chord, it is impossible to extend them into forked branch compartments without a sudden structural discontinuity of at least one compartment, resulting also in a weaked transition zone. Of course, such weakening is offset by the positioning of reinforcements, ribs, hoops and other means to try to reconstitute a continuous structure, but that results in great complication of manufacture. It follows that blades with fork and compartment are practically impossible to manufacture in a simple and so economical way.

SUMMARY OF THE INVENTION

The present invention overcomes such drawbacks by providing a blade in which the resistant framework is formed as two compartments superimposed in the direction of the thickness of the blade so that they may be extended naturally and without solution of continuity into a frame for the branches of the fork fastening the blade to the rotor hub.

More precisely, a first object of the invention is to provide a composite material blade for a helicopter rotor formed in the vicinity of its leading edge by a resisting framework of compartments centered substantially in the front quarter of its current cross section.

According to one of the main characteristics of the invention, this framework comprises two superimposed longitudinal compartments, each compartment extending from the tip to the foot of the blade and each being formed by a front spar and a rear spar formed from a bundle of "rovings" made from fibers preimpregnated with resin, with a filling core made from a light material being disposed between the two spars and a casing enclosing the spars and the core comprising at least one layer of fabrics made from parallel fibers disposed slantwise with respect to the longitudinal axis of the blade so as to form a torsion compartment. The two compartments are joined together by simultaneous polymerization of the superimposed and jointing parts of their respective casing. At the rear of the framework is disposed a filling element and an outer covering envelopes the whole of the framework and the filling element.

In addition to the advantage of such an arrangement concerning the simple construction of the branches of the fork which will be explained in detail hereafter, this structure has a second advantage in so far as safety is concerned in the case of damage or failure (fail safe character) of the blade caused by the impact of a projectile. This advantage is important for blades equipping military helicopters. In fact, a projectile such as a bullet will in practically all cases have a rising path since it is fired from the ground. The impact of the projectile will therefore be situated in the lower compartment. It is certain that, in the impact zone, the torsional strength of the low compartment will be very much reduced. There will however remain an appreciable resistance to torsion provided by the upper compartment which remains well distributed on each side of the pitch axis conventionally situated substantially at the front quarter of the section of the blade. This resistance is further strengthened by the fact that the structure has four spars or struts forming in any case a framework also well distributed about the pitch axis. This is not the case with a single compartment structure, where the torsional stiffness becomes practically zero in the impact zone, nor the case with a multicompartment structure in the direction of the chord of the blade where, although a residual rigidity is kept in the impact zone for the unaffected compartment, there is movement of the resistant zone with respect to the pitch axis and an important change of the distribution of stresses.

Furthermore, considering the case of impact, the fracture of a compartment in the impact zone only causes displacement of the shearing center of the section in the vertical direction, towards the second compartment so that the aerodynamic forces always pass very close to the shearing center which avoids the creation of couplings which may generate dangerous vibrations.

Generally, the "fail safe" character of the current part of a blade is improved by increasing the number of connections between compartments and struts and the quality of these connections which results from the compatibility of the materials used (fabrics, rovings, resins) allowing polymerization as a unit in a single mold, without using added bonding films.

According to another characteristic of the invention, with the blade foot extended by a fork shaped root having two branches, the frame of each branch of the fork is formed by the end of the struts of each compartment, the end of the struts of the upper compartment diverging angularly from the end of the struts of the lower compartment to an appropriate distance from the ends of the branches of said fork, on each side of a wedge shaped filling material. The continuity of the framework right along the blade from its tip to its root is readily and naturally ensured without having recourse to added reinforcement elements.

Advantageously, each strut is formed by a bundle of fibers folded back on itself about a socket for fastening the blade to the hub of the rotor, disposed at the end of each of the branches of said fork.

Furthermore, to the extent that the blade comprises in the neighborhood of its foot a fork joint for fastening a control (pitch variation) or damping member, each leg of which is provided with an articulation socket, it is advantageous to provide a small strut, passing round said socket, formed from a bundle of suitably oriented fibers, applied to the rear strut and incorporated in the resistant framework of the compartment without having recourse to added parts.

The socket of each of the legs of said fork joint may also be incorporated in the framework of the blade by draping the socket with a stack of fabrics (plies) forming a reinforcing about the socket, bearing on the rear strut of the corresponding compartment and covered by the casing of this compartment.

The second object of the invention resides in a process for manufacturing the above blade in which the assembly of its different constituent elements and the polymerization of the resins which impregnate them are carried out in a single mold formed from two rigid half molds whose impression corresponds to the profile of the blade, each of them, prior to closure of the mold, being successively:

coated with layers of skin of the blade and with a part of the layers of parallel fibers forming the casing of the compartment:

equipped with the bundle of rovings situated at the leading edge, provided with the means for filling the compartment with a light cellular material, equipped with the bundle of rovings forming the rear strut of the compartment and with a second part of the fabrics of parallel fibers forming the casing of the compartment, one of them being also provided with the material for filling at the rear of the compartment framework, with the wedge shaped element ensuring divergence of the legs of said fork and with two molding tools for reserving the spaces separating respectively the legs of the fork and those of said fork joint.

In accordance with the process and advantageously the mold is closed first of all for compacting the elements contained in the two half molds, then a metal cap is positioned for protecting the leading edge and the mold is closed and heated for polymerizing the impregnating resins.

BRIEF DESCRIPTION OF THE DRAWINGS

The invention will be better understood from the following description given by way of non-limitative example which illustrates the advantages and secondary characteristics thereof.

Reference is made to the accompanying drawings in which:

FIGS. 3 and 4 are two diagrams of two variants of the blade in the vicinity of its foot.

FIG. 5 illustrates the filling of the mold for forming the blade by a section through its current portion.

FIG. 6 shows the mold of FIG. 5 closed.

FIG. 7 illustrates an assembly detail at the forked root of the blade.

FIG. 8 is a section of the current part of the blade.

DESCRIPTION OF THE PREFERRED EMBODIMENTS

Figure 1:
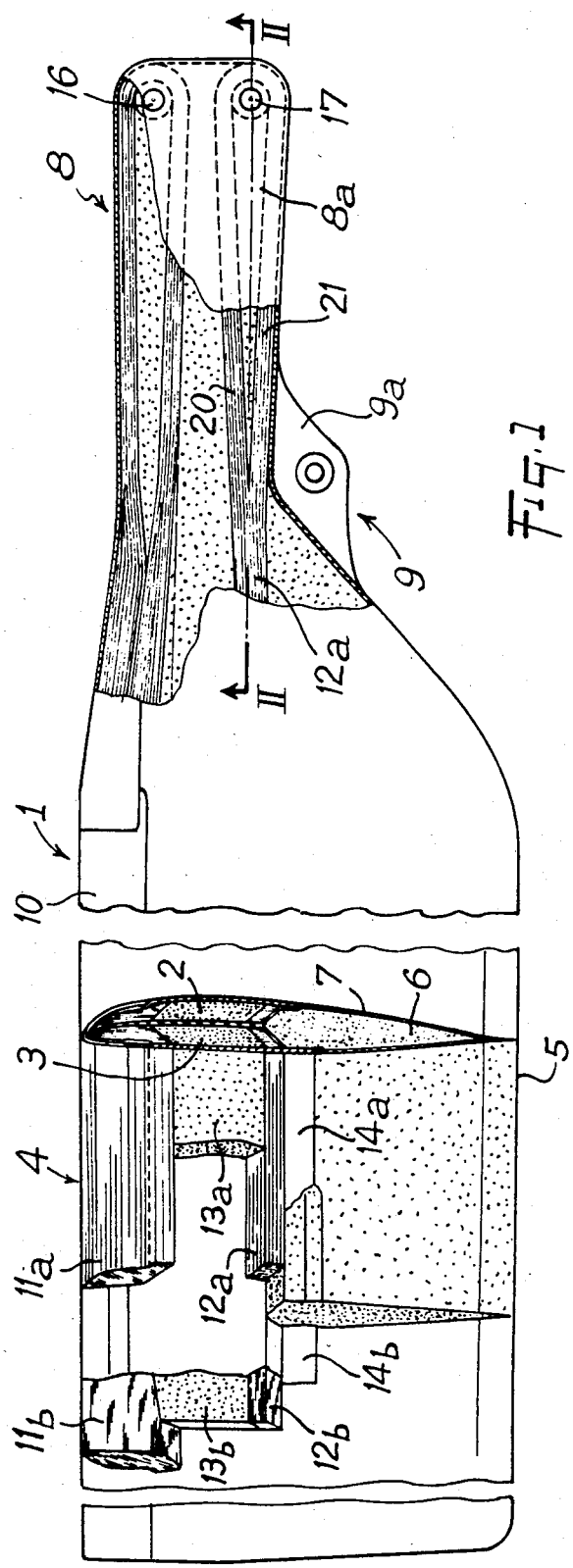
FIG. 1 is a general top view of the blade of the invention with parts cut away in its current part and in partial section at the level of its root.

Referring first of all to FIG. 1 a helicopter blade 1 can be seen made from a composite material in accordance with the invention, a sectional view of the current part of which is shown in detail in FIG. 8. This blade comprises a resistant framework formed of two torsion compartments 2 and 3 superimposed on the leading edge side 4. This framework is extended by a rear part adjacent the trailing edge 5 formed essentially by a filling material 6 (light and cellular such as a foam), the framework and the filling material being enclosed in a casing 7 forming the skin of the blade. For fastening it to a rotor hub, the foot of the blade is in the form of a fork 8 comprising two spaced branches 8a and 8b (see FIG. 2). It also comprises at its foot, a fork joint 9 formed of two legs (only one of which 9a is visible in FIGS. 1 and 2). It also comprises a plate 10 in the form of a cap for protecting its leading edge 4, and made for example from stainless steel.

It can be seen in FIG. 8 that each of the compartments 2 and 3 comprises a front spar or strut 11a, 11b formed externally to the profile of the leading edge, and made from a bundle of fibers, called rovings, preimpregnated with polymerization resin, a rear spar or strut 12a, 12b made from the same material and an intermediate core 13a, 13b (a cellular foam). The assembly of struts and core of each compartment is wrapped in at least one resin preimpregnated layer of fabrics 14a, 14b made from parallel fibers (glass or other) and whose orientation is slanted with respect to the longitudinal axis of the blade. Said layers, in their jointing part, form after polymerization a single wall 15 which forms an extremely stable connection connecting the two compartments together.

In FIG. 1, in the cut away part at the left, can be seen the leading edge strut 11a of the extrados compartment, the core 13a, the rear strut 12a, a portion of the casing 14a which rises as shown in FIG. 8 to the level of the skin of the blade for joining to another end of this casing. This assembly rests on said wall 15 under which is situated the strut 11b of the leading edge of the intrados compartment, the core 13b and the rear strut 12b. A rear end portion of casing 14b is also shown, which receives with the rear end portion of casing 14a the thickest part of the filling material 6.

Figure 2:
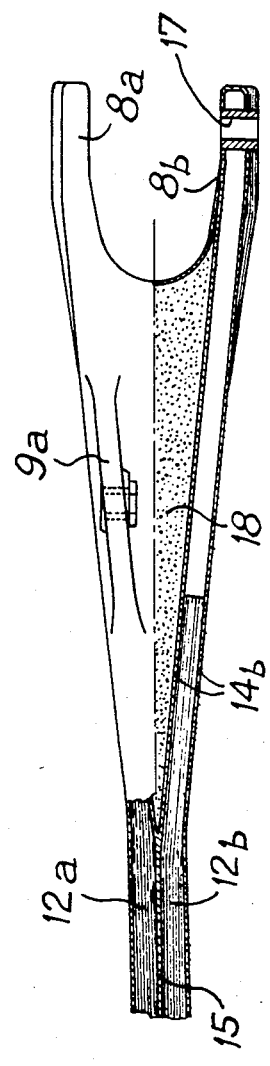
FIG. 2 is a partial section of FIG. 1 through line II—II.

The right hand part of FIG. 2 shows the blade foot from which the skin covering has been partially removed. It can thus be seen that the framework of this blade foot, so the frame of the fixing fork 8 which it comprises, is formed, for each fork branch such as 8a, by the extension of said struts 11a, 11b and 12a, 12b of the corresponding compartment. It will be noted that these struts are in fact each formed by a bundle of rovings folded back on itself about a socket 16, 17 provided at the end of the branches of the fork. Each fork branch 8a, 8b (see FIG. 2) has a framework which is the natural extension of each of the compartments 2 and 3 of the current part of the blade. There is therefore no discontinuity of structure between the current portion of the blade and its fastening portion, the transition zone being again in the form of a torsion compartment quite adapted to the passage of forces.

In FIG. 2 it can be seen that bundles 12a and 12b which extend along the current portion, (like bundles 11a and 11b) adjacent the wall 15, diverge on each side of a wedge shaped element 18 to form the fork branches. The same goes for the casings 14a and 14b which form wall 15.

The diagram of FIG. 3 illustrates the fact that each leg 9a, 9b of the fork joint 9, which has, in a known way an articulation socket 19, may be integrated in the blade foot compartment. In fact, an additional bundle 20 formed of fibers bent around socket 19 is applied against strand 21 of the rear strut and integrates it with the assembly. Of course, draping with fabrics of slanted parallel fibers also covers the socket.

FIG. 4 shows a variant of construction of FIG. 3 in which the legs of fork joint 9 are formed by a stack of preimpregnated fabrics formed as a thick plate 22 which forms the reinforcement about socket 19 and bears against the corresponding rear strand 21 of the bundle 12a of rovings. This stack is, as in the preceding Figure, enclosed in the casing of the compartment.

FIGS. 5, 6 and 7, show schematically the different phases of the method of molding the blade of the invention. In two half molds 23 and 24 are placed successively:

the preimpregnated external covering fabrics 25 of the blade forming its skin 7 with the layers 25 of fabrics made from parallel fibers orientated slant wise with respect to the longitudinal axis of the blade (forming a part of said casings 14a and 14b), the bundles of rovings 26 also preimpregnated forming respectively the front struts 11a and 11b, the slabs 27 of cellular foam shaped to the desired profile which form the cores 13a and 13b, the impregnated bundles of rovings 28 forming the rear struts 12a, 12b of compartments 2 and 3, the layers of preimpregnated parallel fiber fabrics 29 which form the second part of the casings 14a and 14b inside the blade and whose largest surfaces will be joined together by polymerization into a single wall 15 forming a median flange for the blade, finally, in one of the half molds, a slab of foam 30 which forms the filling material 6.

Before closing the mold all the other filling elements required will have been positioned, especially those disposed between the strands of each bundle in line with the sockets 16 and 17 of the fastening fork, the wedge element 18 on each side of which the bundles of rovings diverge, the elements forming the fork joint 9, the metal inserts and the mobile molding pieces (cores) forming the reserves required for forming the spaces separating the legs of the fork 8 and of the fork joint 9. One of these mobile assembly pieces is shown in FIG. 7 by the reference 31. It also serves for holding in place the wedge shaped piece 18 separating the two branches 8a, 8b of fork 8.

The mold thus equipped is closed a first time as shown in FIG. 6 for compacting the different elements placed in position. It is then opened for positioning the shaped cap 10 for protecting the leading edge and is again closed for carrying out the polymerization by heating.

The blade obtained by this method has numerous qualities in so far as its resistance to the forces to which it is subjected is concerned for its resistant framework has four struts disposed about the pitch axis (which is generally situated at the front quarter of its chord), three sole plates (extrados, intrados and median wall 15) and numerous continuous and homogeneous connections (free of any application of bonding agents or films of different natures of resins) between these resistant elements.

The invention finds an interesting application in the field of aeronautic construction.

What is claimed is:

1. A composite material blade for a helicopter rotor comprising a resistant compartmented framework formed in the vicinity of a leading edge of the blade, the resistant compartmented framework being substantially centered at the front quarter of the cross section of the blade, said framework comprising two longitudinal superimposed compartments, each compartment including a front strut and a rear strut, each strut being formed from a bundle of rovings made from resin preimpregnated fibers, a filling core made from a light material disposed between the two struts, and a casing enclosing said struts and said core comprising at least one layer of fabric made from parallel fibers disposed slantwise with respect to the longitudinal axis of the blade so as to form a shell resisting in torsion; the two compartments being joined together by simultaneous ploymerization of the superimposed and jointing parts of their respective casings; a filling element disposed at the rear of the framework; and an external covering covering the whole of the framework and the filling element.

2. The blade as claimed in claim 1, wherein, with the blade foot extended by a root, in the form of a fork with two branches, the framework of each branch of the fork is formed by the end of the struts of each compartment, the extremity of the struts of the upper compartment diverging angularly from the end of the struts of the lower compartment at an appropriate distance from the ends of the branches of said fork, on each side of a wedge shaped filling material.

3. The blade as claimed in claim 2, wherein each strut is formed by a bundle of fibers bent back on itself about a socket for fixing the blade to a hub of the rotor, and disposed at the end of each of the branches of said fork so as to form a double yoke for fixing the blade on the hub by means of two pins introduced in said blade fixing sockets.

4. The blade as claimed in claim 3, wherein, with the blade comprising in the vicinity of its foot a fork joint for fastening a control or damping member, each leg of which is provided with an articulation socket, an additinal bundle surrounds said socket while being applied against the rear strand of the rear strut of each compartment and covered by the casing of the compartment.

5. The blade as claimed in claim 1, wherein, with the blade comprising in the vicinity of its foot a fork joint for fastening a control or damping member, each leg of which is provided with an articulation socket, each of the sockets is draped in a stack of fiber fabrics bearing against the corresponding rear strut and covered by the casing of the compartment.

* * * * *